METAL COATING APPARATUS WITH MOVABLY MOUNTED WIPING MEANS

Original Filed June 10, 1955 3 Sheets-Sheet 1

INVENTOR.
Robert F. Renkin
BY Frease & Bishop
ATTORNEYS

METAL COATING APPARATUS WITH MOVABLY MOUNTED WIPING MEANS

Original Filed June 10, 1955 3 Sheets-Sheet 2

INVENTOR.
Robert F. Renkin
BY
Frease & Bishop
ATTORNEYS

METAL COATING APPARATUS WITH MOVABLY MOUNTED WIPING MEANS

Original Filed June 10, 1955 3 Sheets-Sheet 3

INVENTOR.
Robert F. Renkin
BY
Frease & Bishop
ATTORNEYS

United States Patent Office

Re. 24,985
Reissued May 9, 1961

24,985

METAL COATING APPARATUS WITH MOVABLY MOUNTED WIPING MEANS

Robert F. Renkin, Sharon, Pa., assignor to Sharon Steel Corporation, Sharon, Pa., a corporation of Pennsylvania Original No. 2,848,975, dated Aug. 26, 1958, Ser. No. 514,634, June 10, 1955. Application for reissue Dec. 15, 1958, Ser. No. 780,651

10 Claims. (Cl. 118—68)

Matter enclosed in heavy brackets [ ] appears in the original patent but forms no part of this reissue specification; matter printed in italics indicates the additions made by reissue.

This invention relates broadly to an apparatus for coating metal products and more particularly it pertains to the continuous hot metal coating of steel strip or wire products.

Ordinarily, an operating line for coating metal strip or wire includes a single hot metal coating container or pot containing the coating bath through which the strip or wire moves continuously during the coating operation. When it is desired to coat the strip or wire with another type of hot metal coating, it is necessary to change the hot metal in the coating pot in order to provide for the differently coated material.

In single-pot operation, such a change in the hot coating metal bath requires the hot metal in the pot to be pumped out of the pot and stored in some manner for future use. This storage may be accomplished by casting into suitable pigs for subsequent use or by pumping into a storage pot where the metal can be maintained molten.

After the hot metal has been pumped out of the pot, the pot must be cleaned insofar as it is possible to do so to remove coating metal, dross, impurities, etc. which would contaminate the new bath to be provided in the pot. However, it is substantially impossible to completely remove all such contaminants, and in normal operations, the new coating metal is introduced into the pot either as a solid or a molten bath and heated to a suitable temperature. The line may then be put in operation, but a period of time of such operation will elapse during which the newly provided coating will be contaminated by the former coating metal until an equilibrium has been achieved and bath additions made in order to provide for continuous operation with the newly selected coating formula.

Such a procedure is unsatisfactory because it is time-consuming and expensive. A changeover usually requires that the line be shut down for from thirty-two to forty-eight hours in order to remove and replace the molten coating bath metal. Furthur, after each changeover some metal strip is lost until the metal coating bath is balanced to standards required. Accordingly, great expense is entailed in loss of production and in the production of scrap material until the new coating satisfies required standards.

The construction of the present invention reduces to a minimum the time required to change over a line from operation to provide one type of metal coating to another. By using two or more aligned pots each containing a different hot coating metal bath, the line may be changed over from operation with one pot to another in a very short period of time. After the changeover is made, production of material coated in the newly-connected pot immediately satisfies required standards since no contamination is involved. Accordingly, there is little, if any, loss of material which has been coated; the only loss being material required for rethreading.

The use selectively of two or more aligned coating pots creates another problem where the preparation of the surfaces of the strip for hot metal coating is carried out either in a gas pickling atmosphere or in a protective gas atmosphere. In either event, it is necessary to introduce the strip, after the preparation of the surfaces thereof has been completed, directly into the selected hot metal coating bath without any exposure to the atmosphere. Accordingly, in the operation of a coating line with different pots, each containing a different hot coating metal bath, it is necessary to provide further for the introduction of the material being coated directly without atmospheric exposure into any one of the coating baths from the confined chamber in which a gas pickling or protective gas atmosphere is maintained about the strip surfaces for surface preparation.

Accordingly, it is a primary object of this invention to provide a metal coating line that may be changed from operation with one hot metal coating material to another in a minimum of time.

It is another object of this invention to provide a number of pots of different hot coating metals through which the metal strip to be coated may be selectively continuously passed.

Another object of this invention is to provide a number of pots each containing a different hot metal coating material operable in conjunction with muffle means through which the strip is passed to accomplish proper metal surface preparation for coating.

Finally, it is an object of this invention to provide an improved hot metal coating apparatus which incorporates the foregoing desiderata in an inexpensive manner and with simplified maintenance and operation.

These and other objects and advantages apparent to those skilled in the art from the following description and claims may be obtained, the stated results achieved, and described difficulties overcome by the discoveries, principles, apparatus, parts, combinations, subcombinations and elements which comprise the present invention, the nature of which is set forth in the following statement, the preferred embodiments of which—illustrative of the best mode in which applicant has contemplated applying the principles—is set forth in the following description, and which is particularly and distinctly pointed out and set forth in the appended claims forming part hereof.

Generally, the nature of the present invention may be stated as including in continuous steel strip coating apparatus for coating strip material selectively with different hot coating metals, means for preparing the surfaces of the strip to be receptive of hot metal surface coating, a first pot containing one selected hot coating metal, a second pot containing another selected hot coating metal, means for heating the pots selectively to maintain coating metal molten therein, the pots preferably being aligned with the surface preparation means, a first hot coating metal wiping means adapted to be associated with the first pot, a second hot metal coating wiping means adapted to be associated with the second pot, pot cover means adapted selectively to cover either of the pots, and means for continuously passing strip material through said preparation means, and then selectively through one of said pots and its associated wiping means while the other pot is covered by said cover means.

Furthermore, the nature of the present invention includes when the strip material surfaces are prepared to be coating receptive in a gas atmosphere, a muffle containing the selected gas atmosphere through which the strip is continuously passed, the muffle having an exit end, a first hot metal coating pot at the exit end of the muffle, a second hot metal coating pot spaced from the exit end of the muffle, said pots being aligned with the exit end of the muffle, tubular strip conveying means detachably connected at one end to the exit end of the muffle and having its other end immersed in hot coating metal in said first pot, muffle extension means alternately connectable at one end with the exit end of the muffle, the tubular conveying means being alternately connectable with the other end of the muffle extension means to immerse an end thereof in the hot coating bath in the second pot.

In the drawings which are illustrative of the preferred embodiment of the invention, by way of example, and in which similar numerals refer to similar parts throughout:

Figure 1:
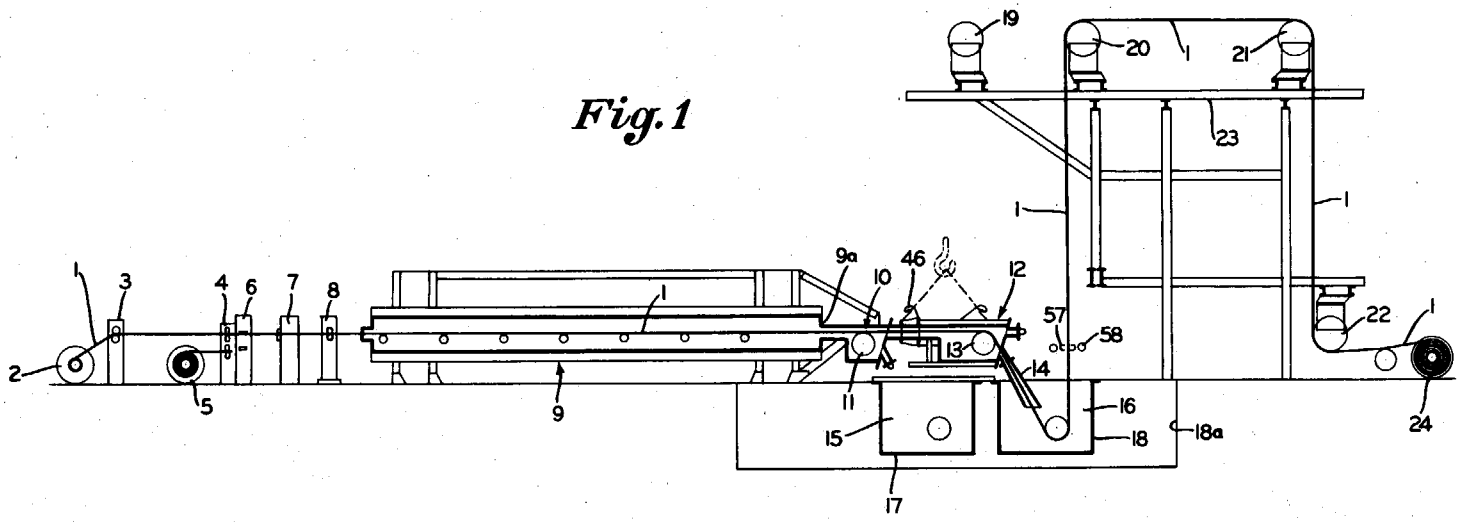
Fig. 1 is a diagrammatic, side elevational view of a coating line, showing the metal strip passing continuously through a hot coating bath of one type of metal or composition.

In Fig. 1 a metal strip 1 issues from an uncoiler 2 through a pair of driven pinch rolls 3 and a second pair of pinch rolls 4. Between the pinch rolls 3 and 4 is mounted a stand-by uncoiler 5 in the usual manner. Adjacent the pinch rolls 4 is a shear stand 6 followed by a normally inoperative welding device 7 and pinch rolls 8 through which the strip 1 passes before entering a furnace, generally indicated at 9. At the exit end 9a of the furnace the strip passes through a muffle, generally indicated at 10, and over a roll 11 therein. From the muffle 10 the strip 1 moves through a muffle extension, generally indicated at 12, and over a roll 13 therein. From the muffle extension 12 the strip 1 passes through a muffle tube or tubular downcomer 14 into one of two coating baths 15 and 16 within containers or pots 17 and 18, respectively. The pots 17 and 18 are within a heated pit 18a below the floor line. The pit 18a may be heated by furnaces, not shown, in the usual manner to maintain the desired bath temperature in either pot 17 or 18. From the coating baths the strip 1 moves upwardly over rolls 19 (Fig. 2), 20, 21, and 22 that are mounted on a cooling tower 23. From the roll 22 the coated strip 1 is recoiled at a coiler 24.

Figure 3:
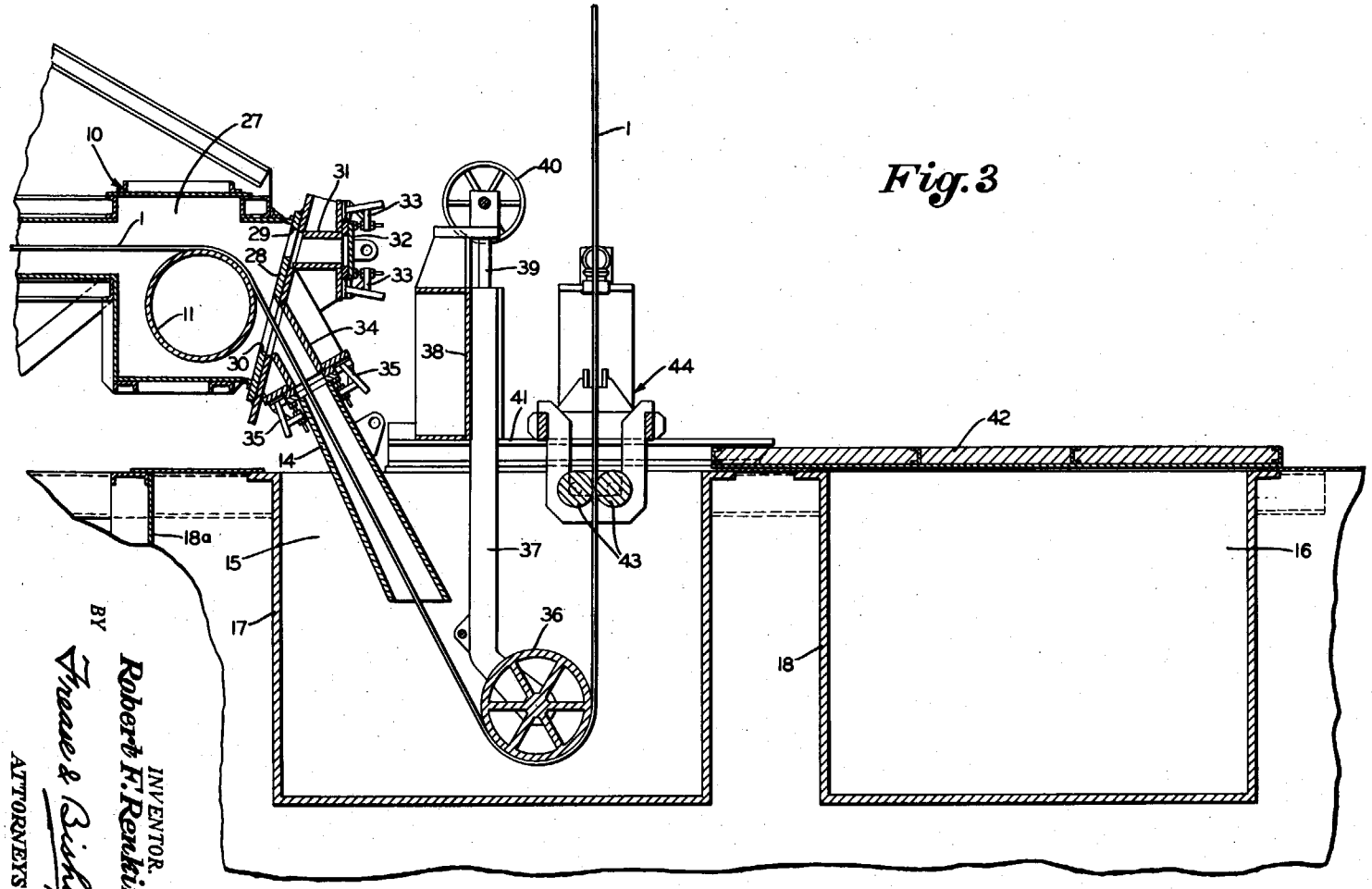
Fig. 3 is an enlarged, longitudinal, sectional view, showing the coating pot unit in detail with the metal strip passing through the one coating bath shown in Fig. 2.
Figure 4:
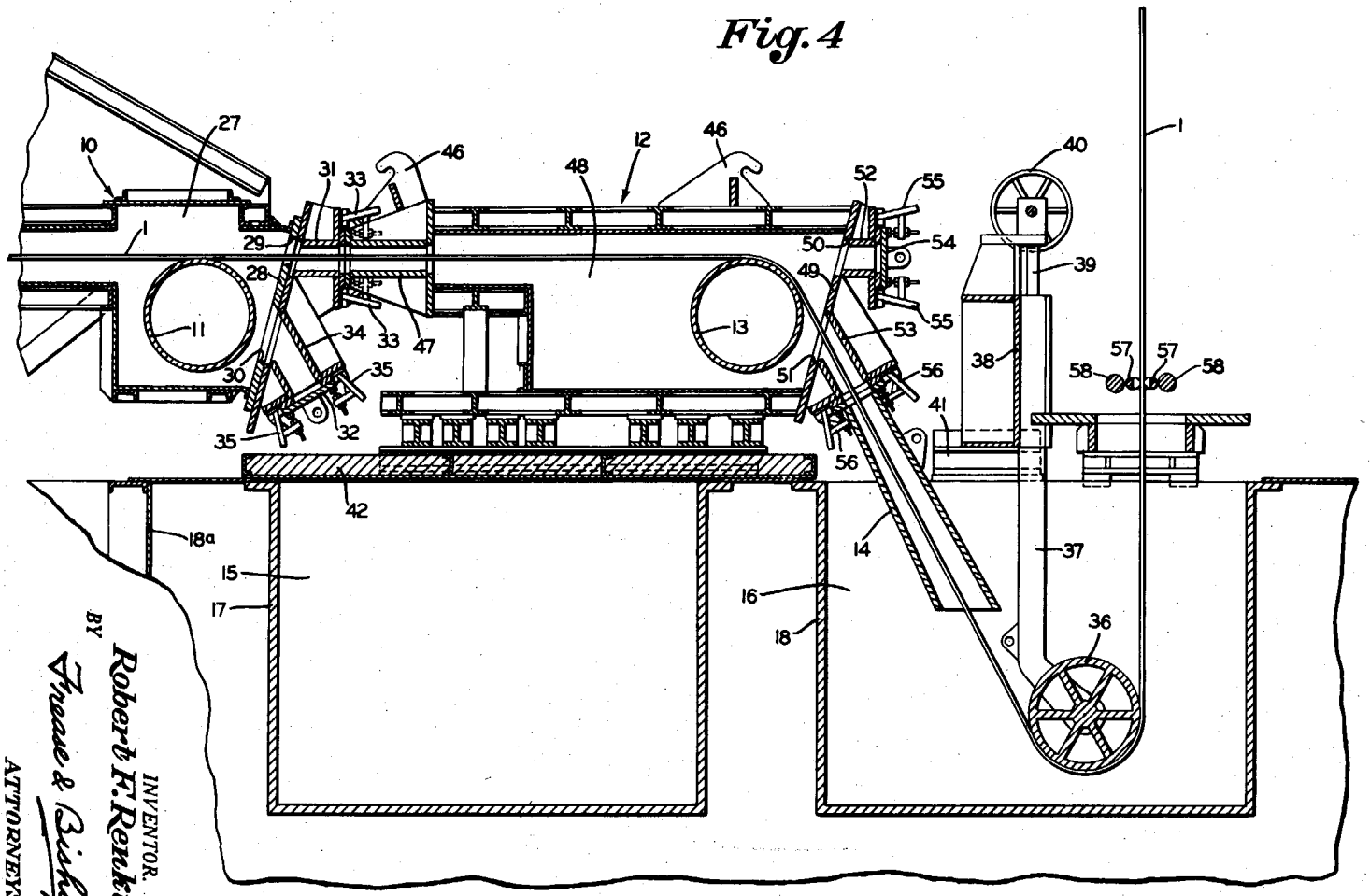
Fig. 4 is an enlarged, longitudinal, sectional view of the coating pot unit, showing the metal strip passing through the other coating bath shown in Fig. 1.

In Figs. 3 and 4 the improved coating pot unit of the present invention is shown more in detail. It includes at least the two coating pots 17 and 18 containing different hot coating metals and the muffle extension 12. In Fig. 3 the strip 1 passes through the muffle 10 at the exit end 9a of the furnace 9. The muffle 10 is airtight in order to preserve whatever gaseous atmosphere may exist within the furnace. The muffle 10 includes opposite side walls 27 between which is mounted the roll 11. The end of the muffle 10 includes an end wall 28 having elongated upper and lower apertures 29 and 30 therein. The upper aperture 29 is aligned with the metal strip 1 issuing from the furnace 9. The lower aperture 30 is positioned so that the metal strip 1 passes through the aperture 30 toward the bath 15 in the pot 17.

Connected to the upper aperture 29 is a port 31 having a closure member 32 detachably secured by a clamp 33. Similarly, a port 34 is secured to the lower aperture 30 which port is inclined along the path of travel along the metal strip 1 moving from the roll 11 to the coating bath 15. The muffle tube 14 is detachably secured to the lower end of the port 34 by means of a clamp 35. Thus, the lower end of the muffle tube 14 is immersed below the surface of the coating bath 15, whereby the gaseous atmosphere within the furnace 9 and muffle 10 is preserved against contamination from the outside atmosphere.

In order to direct the metal strip 1 into and out of the bath 15, a roll 36 is used. The roll 36 is vertically movable at the lower end of a roll mounting or support means 37 which is slidably mounted at its upper end within a bracket 38 at the upper end of which is a screw 39 actuated by a wheel 40. The assembly of the bracket 38, the screw 39 and the wheel 40 is mounted on a base 41 which extends across either pot 17 or 18, as shown in Figs. 3 and 4. At the same time, a pot cover 42 is placed over the particular pot 17 or 18 which is not in use.

Each pot 17 and 18 contains a bath of a different hot metal coating material. For the purposes of illustration the molten metal coating bath 15 may be an ordinary bright zinc galvanizing bath maintained at the desired temperature in the heated pit 18a; and the molten metal coating bath 16 may contain a molten zinc base material which forms a coating suitable for difficult subsequent rolling, forming, drawing or stamping operations. Thus, at least two different molten coating baths are readily available for use when desired. However, other protective metal coating baths such as aluminum or terne may be substituted.

Figure 2:
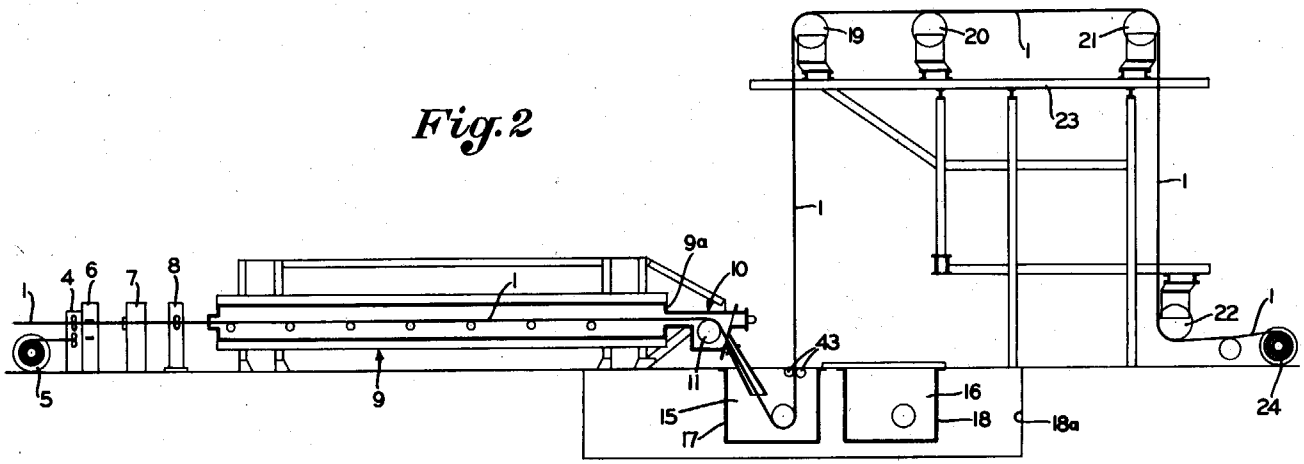
Fig. 2 is a diagrammatic, side elevational view of the apparatus of Fig. 1, showing the metal strip passing through another bath of another type.

Over the pot 17 (Fig. 3) is also mounted a pair of exit wiper rolls 43 on roll support means, generally indicated at 44, extending across the pot 17. The metal strip 1 after passing through the bath 15 also passes between the wiper rolls 43 which are adjustable to control the coating thickness on the strip. As shown in Fig. 2, the strip 1 moves from the rolls 43 upwardly to the cooling tower 23 on and over the rolls 19, 20, 21 and 22.

When the pot 18 is to be used, as shown in Figs. 1 and 4, the pot cover 42 is placed over the pot 17 and the muffle extension 12 is placed to bridge thereover, as shown, by means of a crane connected by cables in a conventional manner to lifting hooks 46. Like the muffle 10, the muffle extension 12 is an airtight chamber having a port 47 at one end connected to the port 31 on the muffle 10 by the clamps 33. When this connection is made, the muffle tube or downcomer 14 is disconnected from the port 34 and the closure 32 is connected thereto (Fig. 4) by the clamps 35 in order to seal the interior of the muffle 10 against air leakage. The muffle extension 12 also includes opposite side walls 48 between which is mounted the roll 13.

In addition, the muffle extension 12 includes an end wall 49 similar to end wall 28 on the muffle 10. The end wall 49 is provided with upper and lower apertures 50 and 51. To apertures 50 and 51 are connected ports 52 and 53, respectively, in a manner similar to the ports 31 and 34 on the end wall 28 of the muffle 10. A closure 54 is mounted on the outer end of the port 52 by means of clamps 55. The port 52 is aligned with ports 31 and 47 to thread the strip 1 through the furnace 9 and the muffle 10 and muffle extension 12. To the lower end of the port 53 is attached the muffle tube or downcomer 14 by the clamps 56 so that the lower end of the tube 14 extends below the surface of the bath 16, as was the case with bath 15 (Fig. 3) when the tube 14 was similarly mounted to the muffle 10. In this manner the gaseous atmosphere condition within the furnace 9 extends not only into the muffle 10 but also into the muffle extension 12, as well as the tube 14.

In Fig. 4 the roll 36 is disposed within the bath 16 in order to direct the strip metal 1 into and out of the bath. Thus, the assembly of the roll 36, the roll support 37, and the bracket 38 is disposed over the bath 16 within the base 41 extending across the top of the pot 18 similar to the manner in which it is mounted over the pot 17 (Fig. 3).

Above the bath 16 is also disposed a pair of stationary wipes 57 which are preferably composed of asbestos and are backed up by a pair of spaced rolls 58, for wiping the different hot metal coating contained in pot 18. The metal strip 1 passes between the asbestos wipes 57 to control the coating thickness on the strip 1. From the wipes 57 the strip 1 passes upwardly over the cooling tower 23 and over the rolls 20, 21 and 22 prior to being coiled at the coiler 24, as shown in Fig. 1.

Accordingly, the present invention provides a new apparatus for coating metal strip by which different hot coating metal may be substituted one for another with a minimum loss of time and expense; by which a protective atmosphere may be provided when desired for metal strip surface preparation; and which solves long-existing problems without requiring extensive redesign of existing apparatus.

It is apparent, although only two spots have been illustrated or described for selective use at the end of a strip steel hot dip coating line, that one or more additional pots containing other selected hot coating metal baths may be associated with the two pots illustrated; and any one of such pots selectively may be operated at any one time for the continuous coating of strip material. Furthermore, the benefits of the invention may be achieved by using the two-pot arrangement without the strip surface being prepared in a controlled gaseous atmosphere, since the strip may be wet pickled or cleaned and fluxed prior to entry selectively into one of the hot metal coating baths contained in the pots.

Finally, any one of the coating pots may be constructed and operated as shown in my Patent No. 2,557,764 wherein two different types of coating may be formed selectively from hot coating metals contained within one main pot.

In the foregoing description, certain terms have been used for brevity, clearness and understanding; but no unnecessary limitations are to be implied therefrom beyond the requirements of the prior art; because such words are used for descriptive purposes herein and not for the purpose of limitation and are intended to be broadly construed.

Moreover, the invention is not limited to the exact apparatus shown because the particular arrangement of the parts may be varied to provide other structural embodiments without departing from the scope of the present invention.

Having now described the features, discoveries and principles of the invention, the construction, operation and use of the improved mechanism and the advantageous, new and useful results obtained thereby; the new and useful parts, elements, constructions, mechanisms, combinations, subcombinations, and arrangements, and mechanical equivalents obvious to those skilled in the art, are set forth in the appended claims.

I claim:

1. In apparatus for continuously hot coating metal strip selectively with different coating metals, means for preparing a coating-receptive surface on the surfaces of a strip, first pot *means adapted to contain a bath of one hot coating metal,* [means, a bath of one hot coating metal in the first pot means,] second pot *means adapted to contain a bath of another hot coating metal,* [means, a bath of another hot coating metal in the second pot means,] heating means for maintaining coating metal molten in at least one of the pot means, pot cover means for the pots removable to uncover the first or second pot means, first hot coating metal wiping means removably mounted on the first pot means when uncovered, second hot metal coating wiping means removably mounted on the second pot means when uncovered; and means for continuously passing strip metal through said surface preparation means, then selectively through *a* [the] bath of molten coating metal in one of said pot means, and then through the wiping means mounted on the last mentioned pot means while the other pot means is covered by said cover means.

2. In apparatus for continuously hot coating metal strip selectively with different coating metals, controlled atmosphere furnace means through which a metal strip is passed for preparing a coating-receptive surface on the surfaces of the strip, the furnace including a muffle having an exit-end, first pot *means adapted to contain a bath of one hot coating metal,* [means, a bath of one hot coating metal in the first pot means,] second pot *means adapted to contain a bath of another hot coating metal,* [means, a bath of another hot coating metal in the second pot means,] heating means for maintaining coating metal molten in at least one of the pot means, pot cover means for the pots removable to uncover the first and second pot means, a muffle tube extending from the muffle exit-end into [the] *a* bath of molten coating metal in one of said pot means when uncovered, means removably mounting the muffle tube on the exit-end of the muffle, muffle extension tube means, means removably mounting one end of the muffle extension tube means on the exit-end of the muffle when the other pot means is uncovered, means mounting the muffle tube on the other end of the muffle extension tube means when said other pot means is uncovered, the muffle tube extending into *a* [the] bath of molten coating metal in the other pot means when the latter is uncovered and when the muffle tube is mounted on the muffle extension tube means; and means for continuously passing strip metal through said controlled atmosphere furnace means, and then selectively through the muffle tube and *a* [the] bath of molten coating metal into which one end of the muffle tube extends and contained in the uncovered pot means while the other pot means is covered by said cover means.

3. Apparatus as defined in claim 2 in which the furnace muffle exit-end is provided with first and second outlet ports, in which the muffle tube is connected with the first outlet port and extends into [the] *a* bath of molten coating metal in one of said pot means when uncovered, and in which the muffle extension tube means is connected with the second outlet port when the muffle tube is connected to the muffle extension tube means and when the muffle tube extends into *a* [the] bath of molten coating metal in the other pot means when the latter is uncovered.

4. Apparatus as defined in claim 3 in which a strip conveyor roll is mounted within the furnace muffle at the exit-end adjacent the first and second outlet ports, and in which the strip is passed over said conveyor roll and selectively through one of said outlet ports as the strip passes to the selected bath of molten coating metal into which one end of the muffle tube extends and contained in the uncovered pot means while the other pot means is covered by said cover means.

5. In apparatus for continuously hot coating metal strip selectively with different coating metals, controlled atmosphere furnace means through which a metal strip is passed for preparing a coating-receptive surface on the surfaces of the strip, the furnace including a muffle having an exit-end, first pot *means adapted to contain a bath of one hot coating metal,* [means, a bath of one hot coating metal in the first pot means,] second pot *means adapted to contain a bath of another hot coating metal,* [means, a bath of another hot coating metal in the second pot means,] heating means for maintaining coating metal molten in at least one of the pot means, pot cover means for the pots removable to uncover the first or second pot means, first hot coating metal wiping means removably mounted on the first pot means when uncovered, second hot coating metal wiping means removably mounted on the second pot means when uncovered, a muffle tube extending from the muffle exit-end into [the] *a* bath of molten coating metal in the first pot means when uncovered, means removably mounting the muffle tube on the exit-end of the muffle, muffle extension tube means, means removably mounting one end of the muffle extension tube means on the exit-end of the muffle when the second pot means is uncovered, means mounting the muffle tube on the other end of the muffle extension tube means when said second pot means is uncovered, the muffle tube extending into *a* [the] bath of molten coating metal *in* [and] the second pot means when the latter is uncovered and when the muffle tube is mounted on the extension tube means; means for continuously passing strip metal through said controlled atmosphere furnace, then selectively through the muffle tube and *a* [the] bath of molten coating metal into which one end of the muffle tube extends and contained in the uncovered pot means while the other pot means is covered by said cover means, and then through the wiping means mounted on the uncovered pot means.

6. Apparatus as defined in claim 5 in which the *first and second* pot means are aligned *with each other and* with the furnace means.

*7. In apparatus for continuously hot coating metal strip selectively with different coating metals, means for preparing a coating-receptive surface on the surfaces of a strip, first pot means adapted to contain a bath of one hot coating metal, second pot means adapted to contain a bath of another hot coating metal, heating means for maintaining coating metal molten in at least one of the pot means, first hot coating metal wiping means for the first pot means, second hot metal coating wiping means for the second pot means, the first and second pot means being aligned with each other and with the surface preparation means, and means for continuously passing strip metal through said surface preparation means, then selectively through a bath of molten coating metal in one of said pot means, and then through the wiping means for the last-mentioned pot means.*

*8. In apparatus for continuously hot coating metal strip selectively with different coating metals, controlled atmosphere furnace means through which a metal strip is passed for preparing a coating-receptive surface on the surfaces of a strip, the furnace including a muffle at its exit end, first pot means adapted to contain a bath of one hot coating metal, second pot means adapted to contain a bath of another hot coating metal, heating means for maintaining coating metal molten in at least one of the pot means, the first and second pot means being aligned with each other and with the furnace means muffle, the muffle being provided with two outlet ports, muffle tube extension means connected selectively with one of said ports and extending into a bath of molten coating metal in one of said pot means forming a communication from said muffle through said selected port directly to said bath of molten metal in said one pot means, closure means for the other of said ports when said one*

*port communicates with said one pot means, and means for continuously passing strip metal through said controlled atmosphere furnace means and muffle, and then selectively through one of said ports and the muffle tube extension means connected thereto, and then through a bath of molten coating metal into which one end of the muffle tube extension means extends.*

*9. Apparatus as defined in claim 8, in which a strip conveyor roll is mounted within the furnace muffle adjacent the first and second outlet ports, in which the strip is passed over said conveyor roll and selectively through one of said outlet ports as the strip passes through the selected bath of molten coating metal into which one end of the muffle tube extension means extends, and in which the muffle tube extension means includes a removable section for connecting one of said outlet ports to one of said pot means.*

*10. In apparatus for continuously hot coating metal strip selectively with different coating metals, controlled atmosphere furnace means through which a metal strip is passed for preparing a coating-receptive surface on the surfaces of a strip, the furnace including a muffle at its exit-end, first pot means adapted to contain a bath of one hot coating metal, second pot means adapted to contain a bath of another hot coating metal, heating means for maintaining coating metal molten in at least one of the pot means, first hot coating metal wiping means for the first pot means, second hot coating metal wiping means for the second pot means, the muffle being provided with first and second outlet ports, muffle tube extension means connected with one of said outlet ports and extending into a bath of molten coating metal in one of said pot means, closure means for the other of said outlet ports, means for continuously passing strip metal through said furnace means and muffle, then through said connected outlet port and the muffle tube extension means connected thereto, then through a bath of molten coating metal into which the muffle extension means extends, and then through the wiping means for said one pot means, and the first and second pot means being aligned with each other and with the furnace means.*

References Cited in the file of this patent or the original patent

UNITED STATES PATENTS

| | | |
|---|---|---|
| 1,924,142 | Willauer | Aug. 29, 1933 |
| 2,159,297 | Shover | May 23, 1939 |
| 2,197,622 | Sendzimir | Apr. 16, 1940 |
| 2,375,434 | Moise et al. | May 8, 1945 |